United States Patent
Perrone et al.

(10) Patent No.: US 6,603,881 B2
(45) Date of Patent: Aug. 5, 2003

(54) SPATIAL SORTING AND FORMATTING FOR HANDWRITING RECOGNITION

(75) Inventors: Michael P. Perrone, Yorktown, NY (US); Eugene H. Ratzlaff, Hopewell Junction, NY (US)

(73) Assignee: International Business Machines Corporation, Armonk, NJ (US)

( * ) Notice: Subject to any disclaimer, the term of this patent is extended or adjusted under 35 U.S.C. 154(b) by 0 days.

(21) Appl. No.: 10/047,152

(22) Filed: Oct. 23, 2001

(65) Prior Publication Data

US 2002/0097909 A1 Jul. 25, 2002

Related U.S. Application Data

(63) Continuation of application No. 09/282,818, filed on Mar. 31, 1999, now Pat. No. 6,333,994.

(51) Int. Cl.[7] .................................................. G06K 9/18
(52) U.S. Cl. ........................ 382/186; 382/181; 382/187; 382/189; 382/202; 382/225
(58) Field of Search .................................. 382/179, 151, 382/181, 185–187, 189, 202, 224, 225, 287, 291, 310, 313; 345/661, 662, 700, 702

(56) References Cited

U.S. PATENT DOCUMENTS

| | | | | |
|---|---|---|---|---|
| 5,249,296 A | * | 9/1993 | Tanaka | 345/799 |
| 5,341,438 A | * | 8/1994 | Clifford | 382/179 |
| 5,517,578 A | * | 5/1996 | Altman et al. | 382/181 |
| 5,850,477 A | * | 12/1998 | Takada | 382/186 |
| 5,903,667 A | * | 5/1999 | Kuzunuki et al. | 382/187 |
| 5,991,441 A | * | 11/1999 | Jourjine | 382/187 |
| 6,021,218 A | * | 2/2000 | Capps et al. | 382/187 |
| 6,088,481 A | * | 7/2000 | Okamoto et al. | 382/189 |

* cited by examiner

Primary Examiner—Daniel G. Mariam
(74) Attorney, Agent, or Firm—F. Chau & Associates, LLP

(57) ABSTRACT

Systems and methods for reordering unconstrained handwriting data using both spatial and temporal interrelationships prior to recognition, and for spatially organizing and formatting machine recognized transcription results. The present invention allows a machine recognizer to generate and present a full and accurate transcription of unconstrained handwriting in its correct spatial context such that the transcription output can appear to "mirror" the corresponding handwriting.

26 Claims, 14 Drawing Sheets

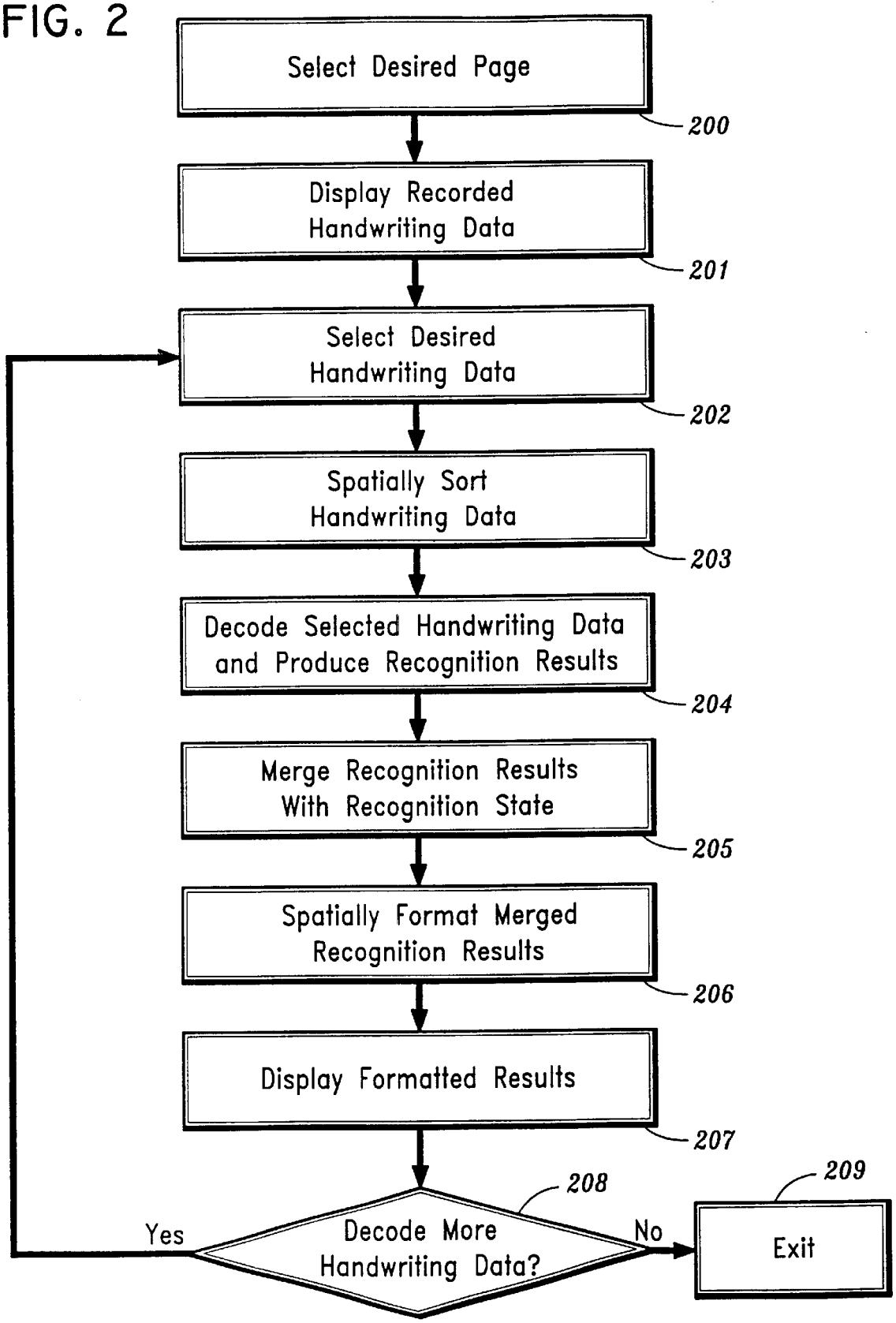

SPATIAL SORTING AND FORMATTING FOR HANDWRITING RECOGNITION

CROSS-REFERENCE TO RELATED APPLICATION

This application is a continuation of U.S. patent application Ser. No. 09/282,818 filed on Mar. 31, 1999, now U.S. Pat. No. 6,333,994.

BACKGROUND

1. Technical Field

The present invention relates generally to machine recognition of handwritten text and, more particularly, to system and methods for preparing and organizing unconstrained handwriting data for machine recognition, and for arranging and formatting the resulting recognition results for display or subsequent post-processing.

2. Description of Related Art

When machine recognition is utilized to transcribe dynamically-recorded handwritten text into useful recognition results (e.g. fonted text, machine commands, database entries, etc.) the recognition results should reflect the intended meaning or purpose of the writer. For example, a horizontal dash through a vertical line must imply the crossing of a "t" and not a hyphen, whereas a table entry must not be formatted to appear as part of a grammatical sentence. In this respect, it is required that recorded series of handwritten strokes (i.e., electronic ink) be suitably organized and arranged for correct recognition, and in many cases, that the output recognition results be appropriately formatted for presentation.

In particular, prior to or concurrently with recognition, the recorded handwritten strokes should be organized such that the strokes are properly grouped and sequenced into letters, words or phrases as they are input to the recognizer. For certain handwriting recording devices, this may be a relatively simple task if the words are entered letter-by-letter, word-by-word, in the same order as they would be read. Such is the case with many real-time handwriting recording and recognition devices (e.g. Apple Newton, Palm Pilot), where the recognition results are strictly dependent on the (time) order in which the recorded handwriting strokes are entered.

When handwriting is recorded in an unconstrained manner, the writer may freely append and insert text anywhere on the handwriting recording surface and in any order so as to e.g., add text, tables, dates, punctuation, corrections, etc. This is typical of a handwriting recording device known as a personal digital notepad (PDN) device. The PDN device includes an electronic stylus having an inking tip which allows the user to write on a piece of paper placed over the digitizing tablet. As the writer writes on the paper, the digitizing tablet generates positional data representing the coordinates of the electronic stylus in relation to the digitizing tablet by detecting, for example, RF (radio frequency) signal emissions generated by the stylus as a user applies the stylus to the surface of the tablet. For each handwritten page, the PDN device may store a corresponding digital page that contains a time-ordered list of "strokes". The term "stroke" as used herein refers to a series of x-y coordinates recorded by the PDN device between the time the electronic pen is detected to contact the writing surface (i.e., a "pen down" signal) and the time the electronic pen is detected to move away from the writing surface (i.e., "a pen-up" signal). With this device, the writer can write one or two paragraphs, for example, and then go back and cross the "t" and dot the "i" handwritten characters, thereby resulting in words having strokes that are not temporally adjacent (although spatially proximate).

Many of the currently available unconstrained handwriting recognition systems attempt to recognize such unconstrained handwriting data in the recorded or temporal sequence at which the handwriting data was recorded. If the user does not write in a disciplined, left-to-right, top-to-bottom order, for example, the decoding accuracy may be compromised. Therefore, in order to obtain increased decoding accuracy of such recorded unconstrained handwriting data, the recognition system should pre-process the handwriting data by appropriately segmenting, grouping and re-sequencing such recorded handwriting data before recognition.

Furthermore, the manner in which the recognition results from the recognizer are formatted is dependent on the environment. In some cases formatting is easy. For example, on many PDAs (e.g. the Newton, the Palm Pilot, etc.), the assumption made is that real-time input can be correctly handled by a typewriter analogy. The user's ink is recognized when written and placed wherever the cursor is on the screen. The ink does not persist after it is recognized, so its original location does not imply or impart any particular meaning or content.

In other situations, such as with PDNs where the ink is written on a larger surface or a piece of paper, the formatting of the recognition results should "mirror" the handwritten ink on the paper as faithfully as possible. This formatting is relatively straightforward when the ink is written to fill in a form which has fields such as name and date in pre-specified and well defined locations. Formatting is very difficult, however, for unconstrained handwriting since the formatting of the structure is not known beforehand. Poor formatting may make the recognition results difficult to read and difficult to use with word processors and other computer applications. In addition, it can lead to a perceived increase in the recognition error rate (e.g. words which are recognized correctly but put in the wrong order may appear to have been misrecognized.) Unfortunately, unconstrained handwriting recognition systems typically use temporal ordering to format recognition results. This leads to numerous problems which degrade perceived recognition accuracy (e.g. spatial information except for carriage returns is ignored leading to numerous out of order sentences, lists, dates, etc.).

SUMMARY

The present application is directed to systems and methods for reordering unconstrained handwriting data using both spatial and temporal interrelationships prior to recognition, and for spatially organizing and formatting machine recognized transcription results. The present invention allows a machine recognizer to generate and present a full and accurate transcription of unconstrained handwriting in its correct spatial context (i.e., the transcription output can appear to "mirror" the corresponding handwriting).

In one aspect, a handwriting recognition system comprises:

means for storing handwriting data, the handwriting data comprising a set of strokes, each stroke comprising a set of x-y coordinates;

a recognition engine; and a system for spatially sorting handwriting data for recognition, the spatial sorting system comprising:

means for determining bounding region information for each stroke based on the x-y coordinates of the stroke;

means for clustering the strokes into groups of spatially-related strokes based on the bounding region information; and means for ordering the clustered groups; and means for submitting the ordered clustered groups to the recognition engine.

In another aspect, the handwriting recognition system further comprises a system for spatially formatting recognition results from the recognition engine, the spatial formatting system comprising means for positioning the recognized text on a display page in a proximate spatial location as the corresponding handwriting data is located on an ink page using the bounding region information for the corresponding handwriting data.

In yet another aspect, the handwriting recognition system further comprises:

means for tracking a recognition state comprising previous recognition results for each stored page of handwriting data; and means for merging current recognition results from the recognition engine with a corresponding recognition state to produce the recognition results that are processed by the spatial formatting system.

These and other aspects, features and advantages of the present invention will be described and become apparent from the following detailed description of preferred embodiments, which is to be read in connection with the accompanying drawings.

BRIEF DESCRIPTION OF THE DRAWINGS

FIG. 2 is a flow diagram of a method for processing unconstrained handwriting data in accordance with one aspect of the present invention;

DETAILED DESCRIPTION OF PREFERRED EMBODIMENTS

It is to be understood that the system elements described herein may be implemented in various forms of hardware, software, firmware, special purpose microprocessors, or a combination thereof. Preferably, the present invention is implemented in software as an application program tangibly embodied on a program storage device. The application program may be downloaded to and executed by a recognition machine having any suitable and preferred microprocessor architecture. Preferably, the recognition machine is implemented as a desktop computer having hardware such as one or more central processing units (CPU), a random access memory (RAM), and input/output (I/O) interface(s). The computer platform also includes an operating system and microinstruction code. The various processes and functions described herein may either be part of the microinstruction code or part of an application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying Figures are preferably implemented as software modules, the actual connections between the system components (or the process steps) may differ depending upon the manner in which the present invention is programmed. Given the teachings herein, one of ordinary skill in the related art will be able to contemplate these and similar implementations or configurations of the present system and methods.

Overview

Figure 1:
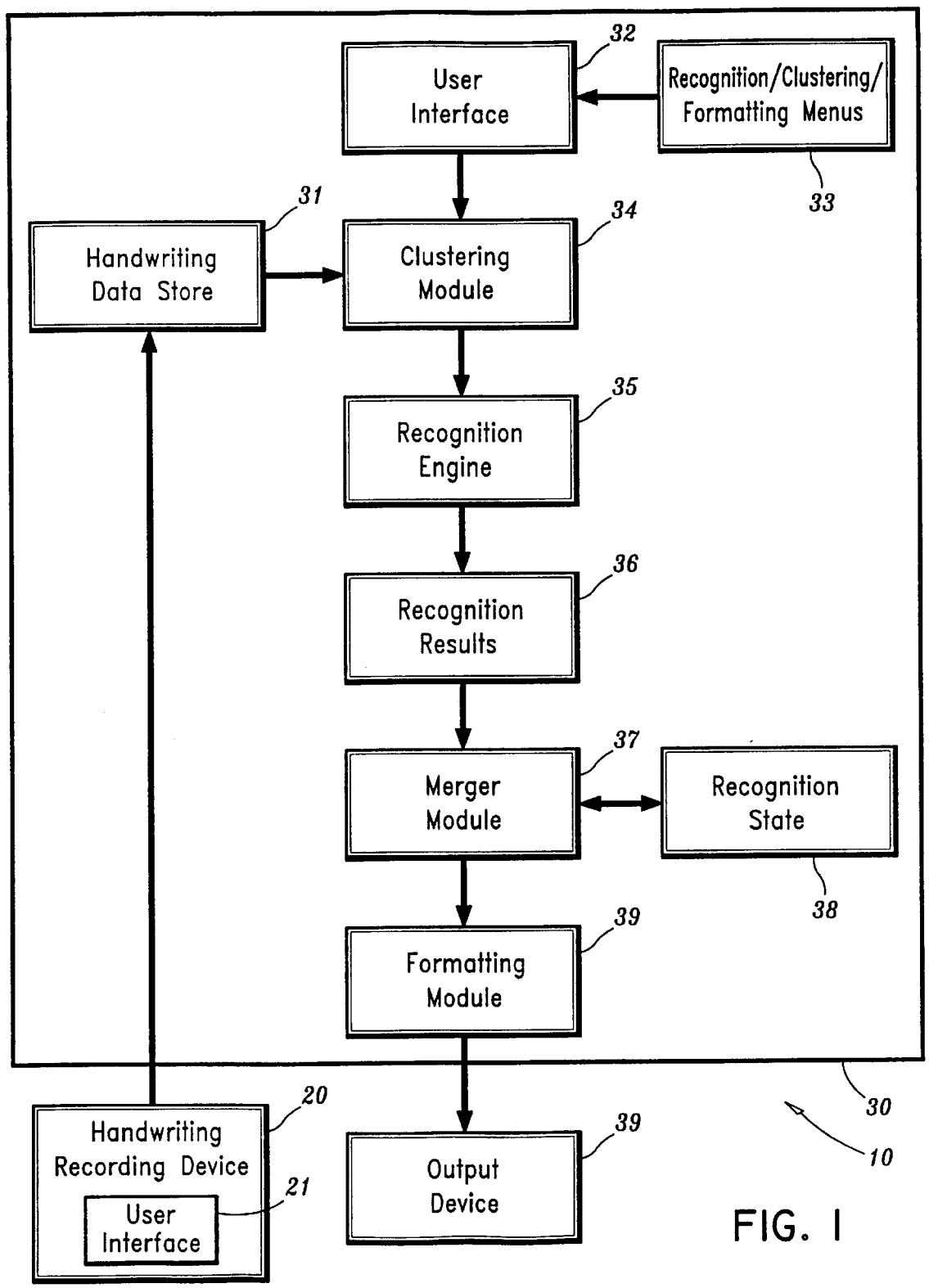
FIG. 1 is a block diagram of a system for processing unconstrained handwriting data in accordance with an embodiment of the present invention.

Referring now to FIG. 1, a block diagram illustrates a system for processing unconstrained handwriting data in accordance with one embodiment of the present invention. The system 10 includes a handwriting recording device 20 (having a user interface 21) for dynamically recording handwritten text and storing the recorded ink. The handwriting recording device 20 can be any conventional device such as PDN device which is configured to dynamically record unconstrained handwritten text. In the PDN, the recorded ink may be stored in "electronic pages" with each electronic page corresponding to a handwritten page. It is to be understood that the terms "handwriting data", "recorded ink" and "strokes" as used herein are synonymous.

The system 10 also includes a handwriting recognition system 30 (e.g., a personal computer) which is configured for processing unconstrained handwriting data in accordance with the teachings herein. The recognition system 30 includes memory 31 for storing recorded handwriting data (hereinafter, alternatively referred to as "ink") which is uploaded from the handwriting recording device 20 The ink may be stored in any suitable conventional format such as a bitmap image or as a sequence of X-Y coordinates which represent the location of the tip of an electronic pen at successive points in time in relation to a digitizing tablet of the handwriting recording device 20.

The recognition system 30 further includes a user interface 32 which may be, for example, a computer display having a suitable GUI (graphic user interface) which allows a user to select one or more recognition, clustering and formatting options via menu option module 33. A clustering module 34 reorders and organizes (i.e, spatially sorts) selected unconstrained handwriting data using spatial and temporal (optional) interrelationships in accordance with the present invention (discussed in detail below).

A recognition engine 35 decodes the (ordered) handwriting data output from the clustering module 34 using any suitable handwriting recognition method known to those skilled in the art. The recognition engine 35 generates a set of recognition results 36 comprising the recognized characters, each having a pointer to align the recognized character (or group of characters) to its corresponding handwriting data.

A merger module 37 retrieves a recognition state from recognition state memory 38 and merges the recognition results 36 with the recognition state. Specifically, the recognition state memory 38 stores a recognition state for each electronic page, with each recognition state comprising previously merged recognition results for the corresponding electronic page. The merger module 37 combines (merges) the recognition results 36 with the recognition state by discarding any portion the recognition state which corresponds to the recognition results 36 (i.e., if any recognition results of the recognition state and the recognition results 36 align to the same recorded ink). The merged recognition results are then stored in memory 38 as the current recognition state for the given page. In this manner, the recognition state is updated after each decoding operation.

The merged recognition results (i.e., updated recognition state) are output from the merger module 37 and processed by formatting module 39 to spatially format the merged recognition results in accordance with the teachings herein. In particular, the formatting module 39 employs novel techniques (discussed in detail below) for positioning the merged recognition results on a page for display such that the displayed recognized text is placed in the same approximate location as the corresponding handwriting ink (before recognition) appears in the ink window (i.e., displayed on computer screen). The formatted recognition results are then output by output device 40 which may be a printer or a computer monitor, for example.

It is to be understood that each of the above-described modules of the recognition system 30 may be employed directly in the handwriting recording device 20 thereby eliminating the need to upload the recorded handwriting data to the remote recognition system 30. It is to be further understood that the clustering module 34 and the formatting module 39 are independent of one another and that the present invention may be implemented with either one or both of these components. In addition, the merger module 37 is-optional and the operation of the formatting module 39 is not dependent on the merger module 37.

Referring now to FIG. 2, a general flow diagram illustrates a method for processing unconstrained handwriting data in accordance with one aspect of the present invention. As discussed above, handwriting data is collected via the handwriting recording device 20 and stored in corresponding electronic pages. The electronic pages (with the recorded ink) may be uploaded to a handwriting recognition system (e.g., personal computer) having the modules of the recognition system depicted in FIG. 1. The recognition system 30 may be configured to operate as follows. Initially, the user will select a desired electronic page (step 200) having ink which the user desires to have decoded. The handwriting data of the selected electronic page will then be displayed (step 201), thereby allowing the user to select either all or a portion of the displayed handwriting data for recognition (step 202).

Next, all the handwriting data of the selected electronic page (or only the selected ink) will be spatially sorted (step 203) using one of the present clustering methods (as discussed in detail below with reference to FIG. 4). Next, the selected ink will be decoded and the recognition results will be produced (step 204). The recognition results may then be merged with a current recognition state (step 205) (as discussed below in detail with reference to FIG. 6). The merged recognition results are then spatially formatted (step 206) using one of the present formatting methods (as discussed in detail below with reference to FIGS. 5 and 7–8) and the formatted recognition results are displayed (step 207). If the user wants to recognize additional ink on the selected page (step 208), the user will select the desired ink (return to step 202) and the process (i.e., steps 203–207) is repeated.

Merging

Figure 6:
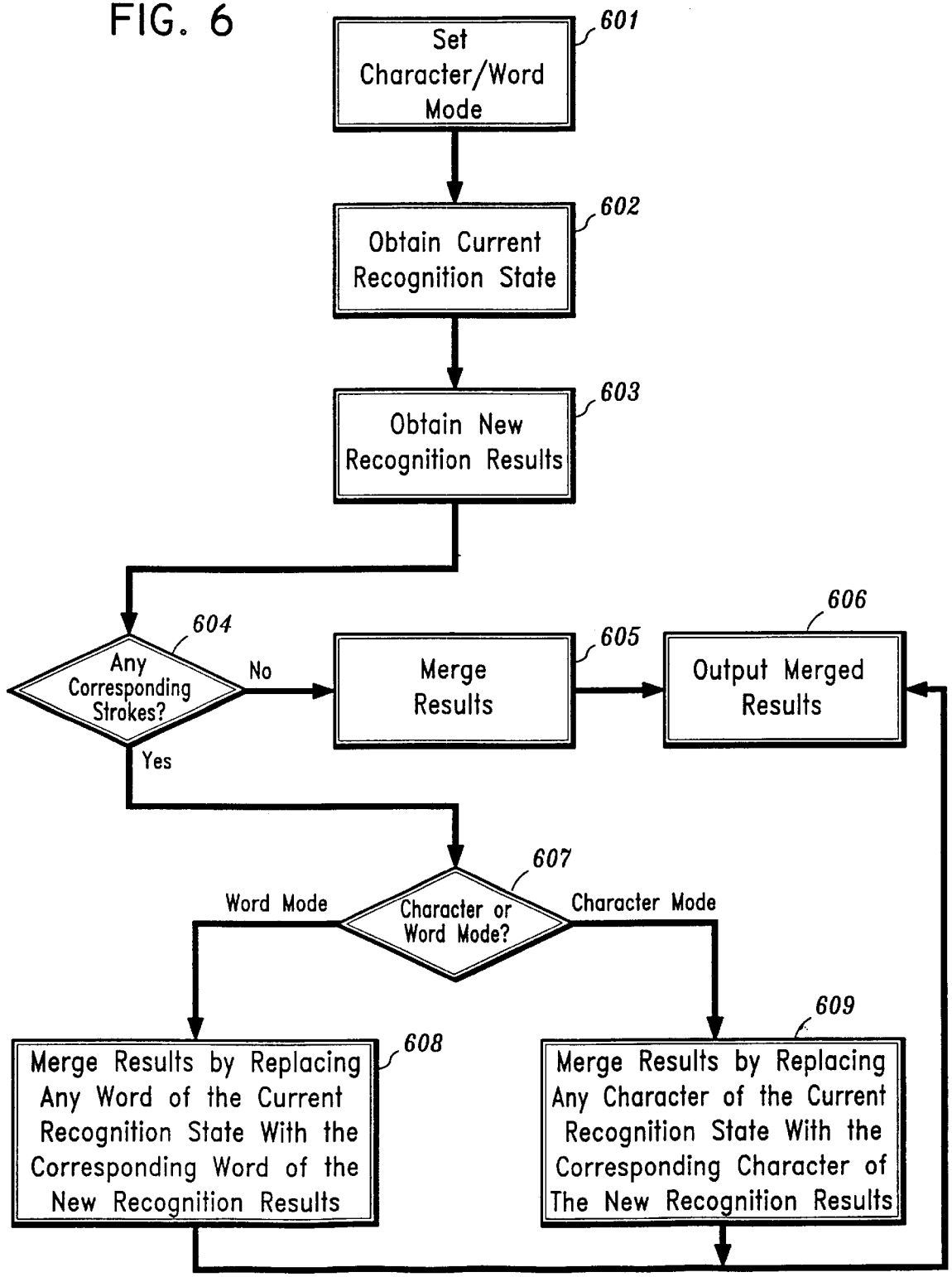
FIG. 6 is a flow diagram of a method for merging recognition results in accordance with one aspect of the present invention.

One method which may be employed in accordance with the present invention for merging the recognition results with the current recognition state will now be discussed with reference to the flow diagram of FIG. 6. Initially, either a "character mode" or a "word mode" is selected for operation of the merging process (step 601). Next, the current recognition state for the page is obtained (step 602) and the new recognition results of the selected ink are obtained from the recognition engine (step 603). It is to be understood that if there is no current recognition state for the page (i.e., "null state"), then the merging process is terminated (i.e., the new recognition results are sent for spatially formatting). A determination is then made as to whether any strokes associated with recognition results of the current recognition state correspond to any strokes associated with the new recognition results (step 604). If there are no corresponding strokes (negative result in step 604), then the new recognition results are merged with the current recognition state (step 605) and the merged recognition results are output for further processing (step 606).

On the other hand, if it is determined that one or more strokes associated with the recognition results of the current recognition state correspond to strokes associated with the new recognition results (affirmative determination in step 604), then the merging process will depend on whether the system is in the character or word mode (step 607). If the system is determined to be in the word mode, then the new recognition results are merged with the current recognition state by replacing any previously recognized word of the current recognition state with a corresponding recognized word of the new recognition results (step 608). Specifically, the previously recognized word (of the current recognition state) will be replaced by the newly recognized word if the previous word contains ink which corresponds to any ink of the newly recognized word. If the system is determined to be in the character mode (step 607), then the merging process is performed by replacing any previously recognized character in the current recognition state with a corresponding recognized character of the new recognition results (step 609). Specifically, the previously recognized character will be replaced with a newly recognized character if the previous and new recognized character are aligned to the same ink (step 609). It is to be appreciated that the merging process ensures that repeated recognition operations will not erase previous recognition results (of the current recognition state) unless a portion of the new recognition results contain ink from a previous operation.

Bounding Region and Bounding Region Overlap

In order to implement the spatial sorting and spatial formatting processes (which are discussed in detail below), the concept of a "bounding box" or "bounding region" may be applied. A "bounding region" may be defined as that region of space that surrounds a stroke or a group of strokes based on the recorded x-y coordinates of the strokes on a page of ink. As explained above, a page of ink is a time-ordered list of each stroke with its attributes. Each stroke contains a series of recorded x-y coordinates which are detected between a "pen-down" and "pen-up" signal. Therefore, for cursive handwriting, a stroke may represent one handwritten word and for printed text each stroke may represent one handwritten character. By processing the recorded strokes into "bounding regions", the recorded strokes may be spatially sorted and organized for recognition and the corresponding recognition results can be accurately placed in the correct spatial context for subsequent display.

Figure 3A:
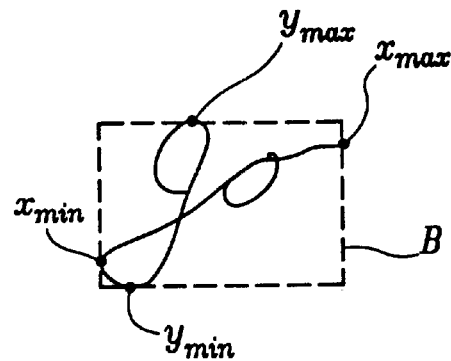
FIGS. 3a, 3b, 3c, 3d, and 3e are diagrams which illustrate "bounding region" and "bounding region overlap" concepts in accordance with the present invention.

It is to be appreciated that the bounding region may be defined in various manners. For instance, a bounding region can be defined in terms of the x and/or y extents of the recorded ink (i.e, the maximum and minimum recorded x and/or y coordinates of the strokes). For instance, as shown in FIG. 3a, a bounding region B for the cursive word "go" (which comprises one stroke) can be defined by a "box" based on the minimum and maximum x and y coordinates of the stroke.

A bounding region may also be defined based on stroke membership. In particular, a bounding region of a given stroke can first be determined (using any desired method) and then used as the basis for determining whether other strokes should be included as members of the bounding region. For instance, stroke membership may be determined based on the distance of a given stroke from the bounding region. Stroke membership may also be determined based on the percentage of a stroke (stroke length) within and without the bounding region. The computed distance (or the computed percentage) can then be compared to a corresponding predetermined threshold value so as to determine whether a given stroke should be deemed a member of the bounding region.

Figure 3B:
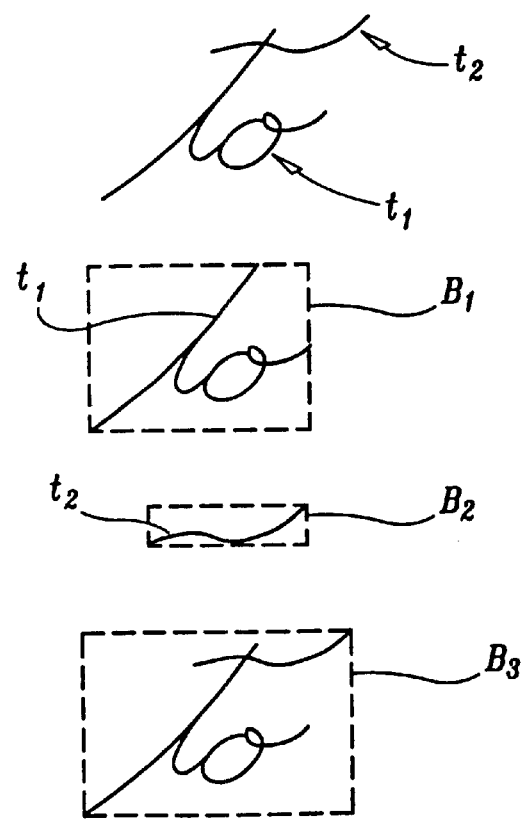

The "stroke membership" bounding region concept is illustrated by way of example with reference to FIG. 3b. As shown, the cursive word "to" comprises two recorded strokes —one stroke (t1) for the word "to" and one stroke (t2) for the crossing of the "t" character. The first stroke (t1) may have bounding region B1 and the second stroke (t2) may have bounding region B2 Based on the distance between B1 and B2 for example, the strokes may be combined and become members of bounding region B3. It is to be understood by those skilled in the art that depending on the application, the bounding region B3 may be computed by adding bounding regions B1 and B2 (as shown), or stroke t2 may just be added as a member of bounding region B1 (without adding the data of bounding region B2 to create B3).

Stroke membership of a given bounding region can also be determined probabilistically, i.e., by the mean and variance of the ink. In particular, stroke membership can be determined by determining the degree of the distance (i.e., variance) of each recorded coordinate (point) of the stroke in relation to the mean, i.e., how much the ink "spreads" in relation to the mean. The mean and variance approach would be more forgiving for writers with handwriting characterize by flourishes or long ascenders/descenders which overlap other lines.

Figure 3C:
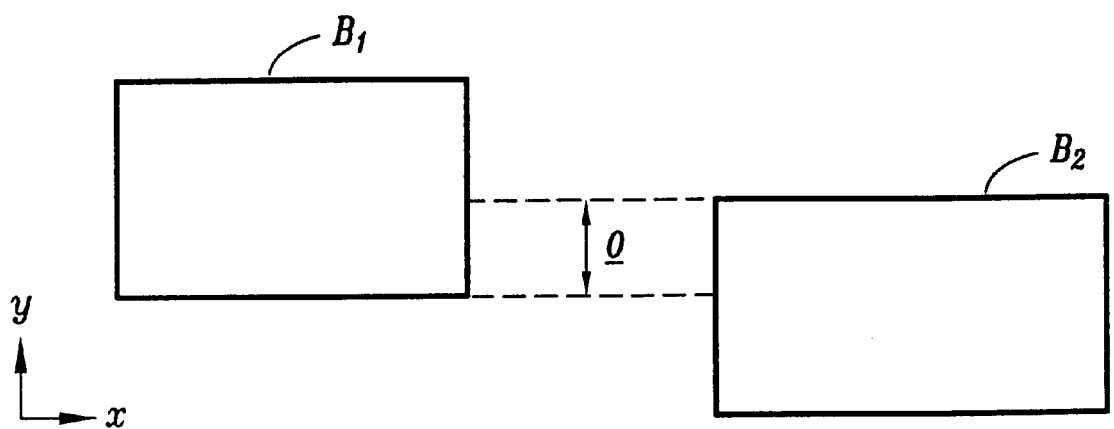
Figure 3D:
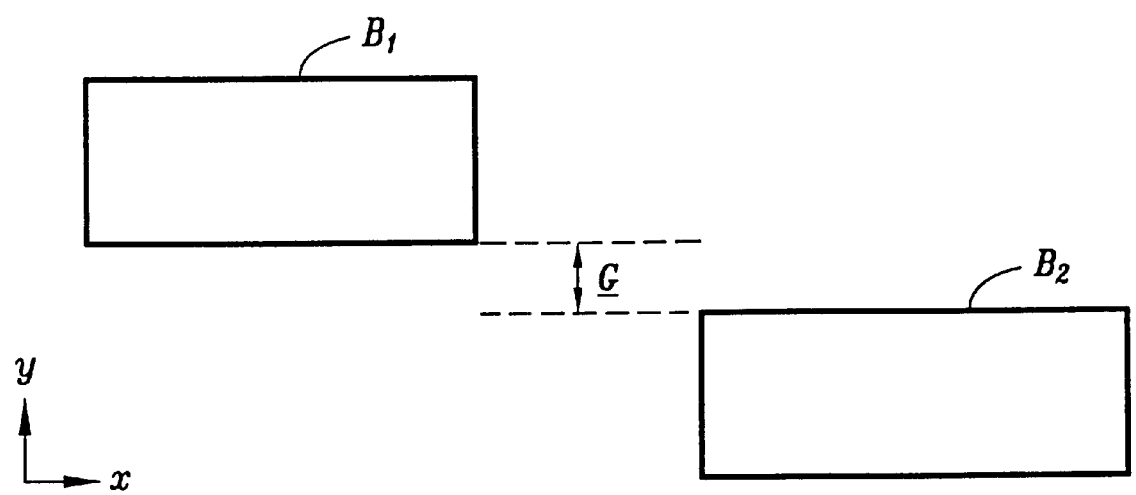

Another concept which may be utilized in the spatial sorting and spatial formatting processes of the present invention is the "bounding region overlap" concept. The term "bounding region overlap" refers to two or more defined bounding regions having overlapping x and/or y projections. The "bounding region overlap" may be defined in various manners. For instance, two or more bounding regions may be deemed to overlap if (1) the x and/or y projections of such bounding regions have any overlapping portions (i.e. strict overlap). This is shown by way of example with reference to FIG. 3c. In FIG. 3c, it is assumed that bounding regions B1 and B2 are defined as "boxes" based on X and Y extents of their corresponding member strokes (not shown). The bounding regions B1 and B2 may be deemed to overlap based on the overlapping y coordinates (denoted by a y overlap range "O"). In addition, the bounding regions B1 and B2 may be deemed to overlap if the overlap range "O" exceeds some predetermined threshold (i.e., "threshold overlap") which may depend on the relative size of bounding regions (e.g. punctuation bounding regions will be much smaller than average which might be used to force merges/overlap). In addition, the predetermined threshold may even be defined as a "negative overlap". For instance, referring to FIG. 3d, the bounding regions B1 and B2 may be deemed overlapping if overlap gap (denoted by "G") does not exceed some predetermined overlap threshold value.

In addition, the "bounding region overlap" may be defined as a mean/variance overlap. In one aspect, an adjusted bounding region is first computed based on the standard deviation from the mean and the overlap is determined as discussed above (i.e., strict or threshold overlap). In another aspect, a gaussian overlap may be defined, for example, by computing the gaussian overlap for X based on the following:

$$X_{overlap} = \text{Max}[\sigma 1_X, \sigma 2_X](S_X)\exp\frac{-(S_X)^2(\mu 1_X - \mu 2_X)^2}{2}$$

where $\text{Max}[\sigma 1_X, \sigma 2_X]$ is equal to the larger of the standard deviation (variance of a first bonding region 1 in the x direction and a second bounding region 2 in the x direction, where $$S_X = \frac{1}{\sqrt{(\sigma 1_X)^2 + (\sigma 2_X)^2}}$$

and where $(\mu 1_X - \mu 2_X)$ is equal to the difference between the mean of the first bounding region in the X direction and the mean of the second bounding region in the X direction. It is to be understood that the above equations may be applied for the y direction.

Other methods for defining the "bounding region overlap" concept include dynamic thresholds. These thresholds allow the significance of an overlap to be dynamically determined. The thresholds could be learned, met by default, or user-defined. The thresholds could dynamically vary depending on the data collected and/or user-defined thresholds. This is particularly-applicable to the spatial sorting process of the present invention, for example, with respect to the thresholds utilized during a line building and line spacing process (as discussed in detail below) which are dependent on the data collected.

Spatial Sorting

Figure 4:
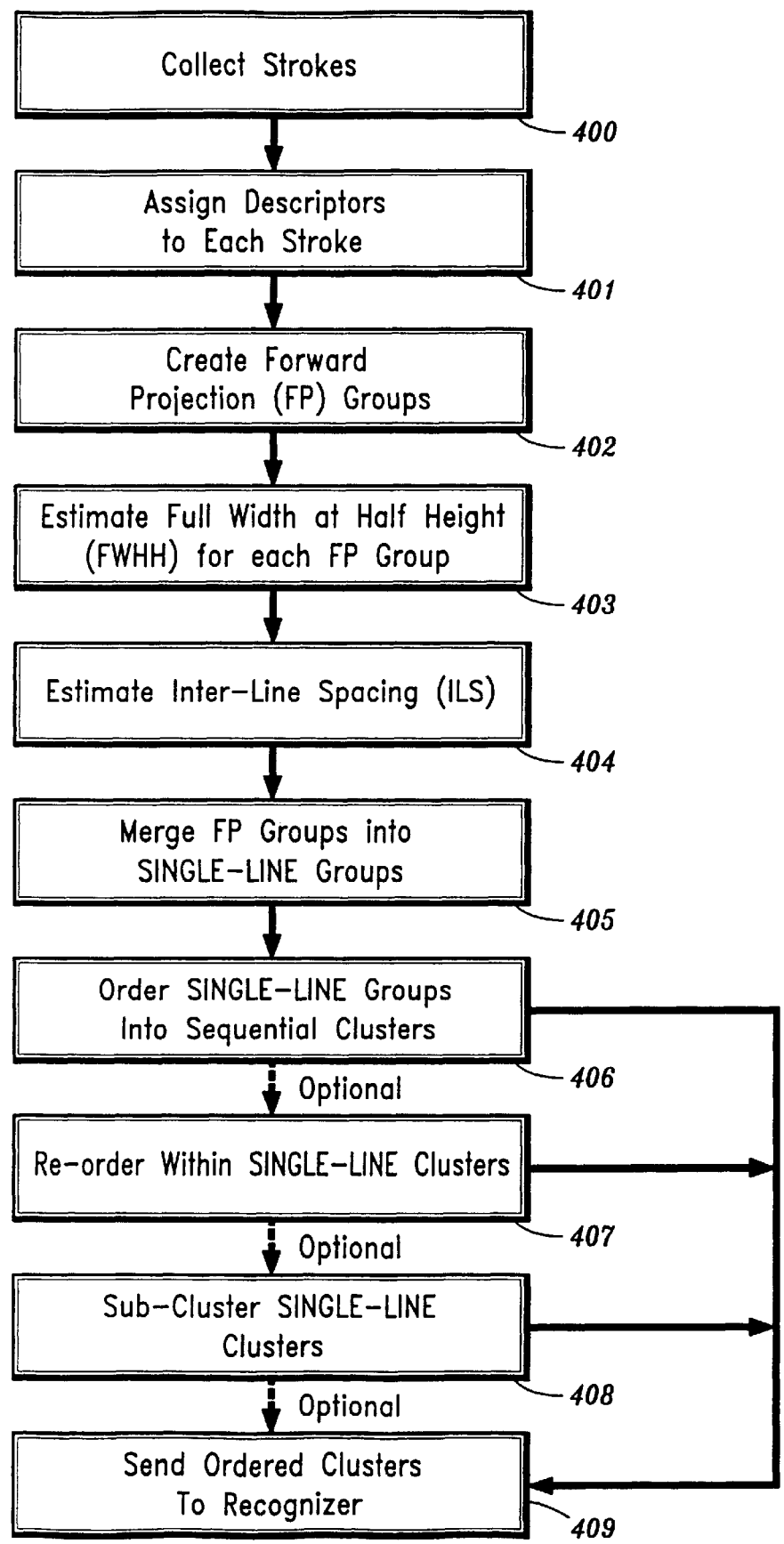
FIG. 4 is a flow diagram of a method for clustering unconstrained handwriting data in accordance with one aspect of the present invention.

Referring now to FIG. 4, a flow diagram illustrates a method for spatial sorting (clustering) which may be employed in the clustering module 34 of FIG. 1 and step 203 of FIG. 2). It is to be understood that for purposes of illustration, the following description will refer to clustering alphabetic languages (such as English) where the language is read from left-to-right and top-to-bottom. It is to be understood, however that the present invention teaches concepts and processes useful for other languages.

Referring to FIG. 4, initially, all the strokes associated with a desired page will be collected and their bounding regions determined (step 400). The bounding region of each stroke may be determined, for example, by projecting the strokes onto a y-axis. Next, all the strokes are clustered into "Single-Line" (SL) groups. Each SL group contains all spatially related strokes corresponding to the handwriting of a single line on the handwritten page (irrespective of the temporal order of the recorded strokes). The process of clustering into SL groups is a bottom-up approach which applies the above-described "bounding region" and "bounding region overlap" concepts and proceeds as follows. Initially, descriptors are assigned to each and every individual stroke (step 401). Descriptors include both exact measurements and metrics, such as X and Y extrema and stroke length, width and height, as well as estimates of the nature of the stroke such as the extent to which the stroke appears to be a dot or straight line.

Next, groups of strokes called "Forward Projection" (FP) groups are created (step 402). In order to join strokes into a FP group, they should have strongly overlapping Y-axis projections (e.g., the "bounding region overlap" of the "bounding regions" of such strokes should meet a predefined value). In addition, the temporal relationship of stokes may be considered when forming FP groups (e.g., strokes should be temporally adjacent). In addition, other positive descriptor evidence which indicates that strokes definitely belong near each other on the same line are also considered when creating FP groups. It is to be understood that a single stroke that is not merged with one or more-strokes forms its own FP group.

Figure 3E:
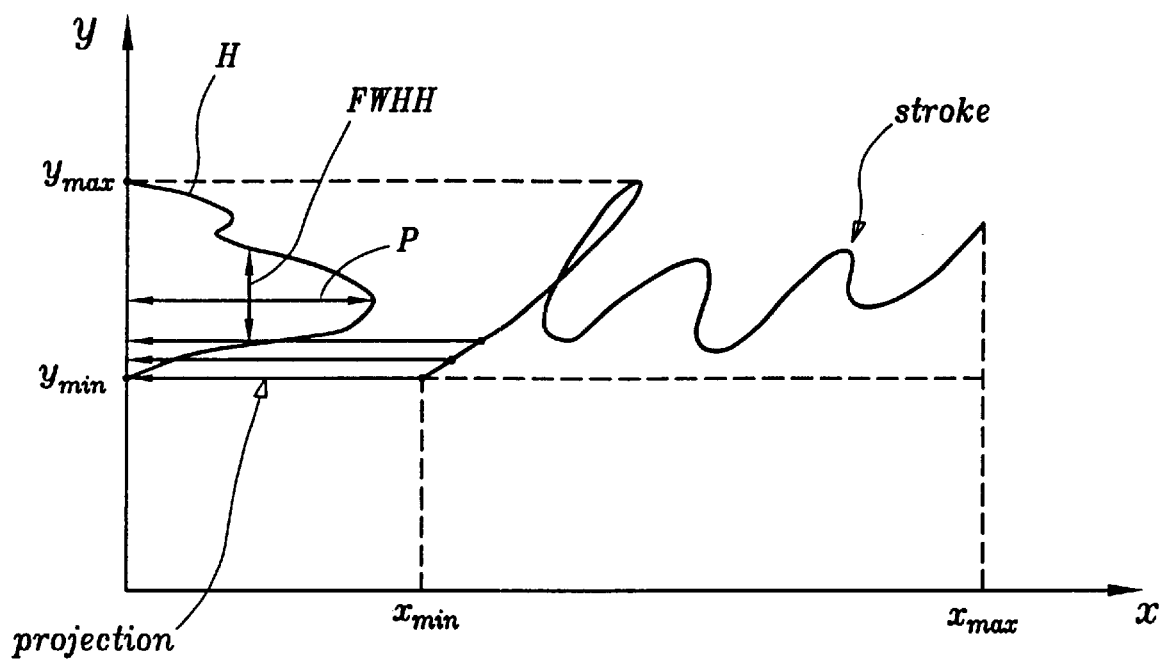

Next, a "Full Width at Half Height" (FWHH) is estimated for each FP group (step 403). This FWHH process is one specific example of the "bounding region" concept discussed above, and is illustrated in FIG. 3e. Particularly, for a given FP group (which is shown in 3e comprising one stroke), the corresponding strokes are projected onto the Y-axis and a smoothed histogram (H) is generated for the projection. The peak center (P) is determined and the FWHH is estimated for each FP histogram. Then, an overall FWHH is estimated for all the FP groups by calculating the statistical means of all the FWHH estimates of the FP groups. It is to be appreciated that the overall FWHH is useful because it has a consistent relationship to character size.

An "Inter-Line Spacing" (ILS) value is then estimated (step 404). The ILS is estimated by first projecting all strokes (from step 400) for a given page onto the Y-axis and autocorrelating the projection. The autocorrelation gives rise to peaks that are a function of the periodicity of the data. The autocorrelation peaks and valleys are evaluated to determine the line spacing and to estimate the reliability of the measurement. If the reliability estimate of the autocorrelation is found to be low, alternately or as a confirmation, the ILS may be estimated using a fitting function (as is understood to those skilled in the art) which finds the best-fit inter-line estimate by first calculating the distance to a set of hypothesized lines with varying inter-line distances, and then choosing the set with the minimum distance.

Next, the FP groups are merged into Single Line (SL) groups (step 405) (i.e., two or more bounding regions having FP groups (strokes) are combined and a new bounding region is defined). This is performed using any iterative method that operates to first merge FP groups that are most simply and certainly on the same line (e.g., based on the y-overlap of the bounding regions of the FP groups), followed by merging remaining FP groups on the basis of less certain or more difficult evaluated evidence. It is to be appreciated that the evidences or variables which may be used in a suitable merging algorithm include the following: (a) strong overlap of Y-axis group projections; (b) nearness of Y-axis center-of-gravity of two FP groups with respect to FWHH; (c) ILS; (d) temporal relationships of strokes; (e) spatial relationships of strokes; (f) group magnitude (number, size, and extent of all strokes in group); and (g) descriptor estimates for single-stroke groups. It is to be understood that these evidences are-specific implementations of the bounding region and/or bounding region overlap concepts discussed above.

Next, the SL groups are ordered into sequential clusters (step 406) (e.g., from top-to-bottom) and the ordered clusters are sent to the recognition engine (step 409). Alternatively, based on the requirements of the handwriting recognition engine which is utilized, the strokes comprising the SL groups may be further reordered (step 407) and subdivided (step 408) in a manner which is suitable for the recognition engine. The step of reordering (step 407) and the step of subdividing (step 408) the strokes of each SL group into subgroups involves calculating X-axis projection for each stroke in the SL group, and then creating subgroups of strokes such that the X-axis projections of the strokes within a subgroup are overlapping or abutting. The subgroups are then ordered within the SL group from left-to-right, with the strokes within a given subgroup being ordered either temporally or as otherwise required by the recognition machine. The reordered SL groups may then be sent to the recognition engine (step 409).

Alternatively, the reordered SL groups (of step 407) may be further clustered into Phrases (i.e., groups of strokes that may be deemed isolated words or word sequences according to their spatial ordering) (step 408). The Phrases are generated by detecting large gaps between the stroke subgroups that can easily be determined to be gaps between words (and not gaps within words). The Phrases are then sent to the recognition engine for decoding (step 409) in the order of top-to-bottom and left-to-right. The recognition results are then returned. As stated above, each recognized word or symbol result is aligned to the corresponding stroke(s).

Spatial Formatting of Recognition Results

The next phase of operation in accordance with the present invention is spatially formatting the recognition results. One desired goal of the process of spatial formatting of recognition results is to place the text of the recognition results on a display page in approximately the same corresponding location as the ink is on the ink page so as to obtain an increase in the perceived recognition accuracy of handwritten text. Consequently, by placing the recognition results in the recognition results window in the same approximate location as the corresponding ink is displayed in the ink window (or on the corresponding handwritten page), the problems associated with the conventional formatting process which utilizes simple temporal sorting may be eliminated.

Figure 5:
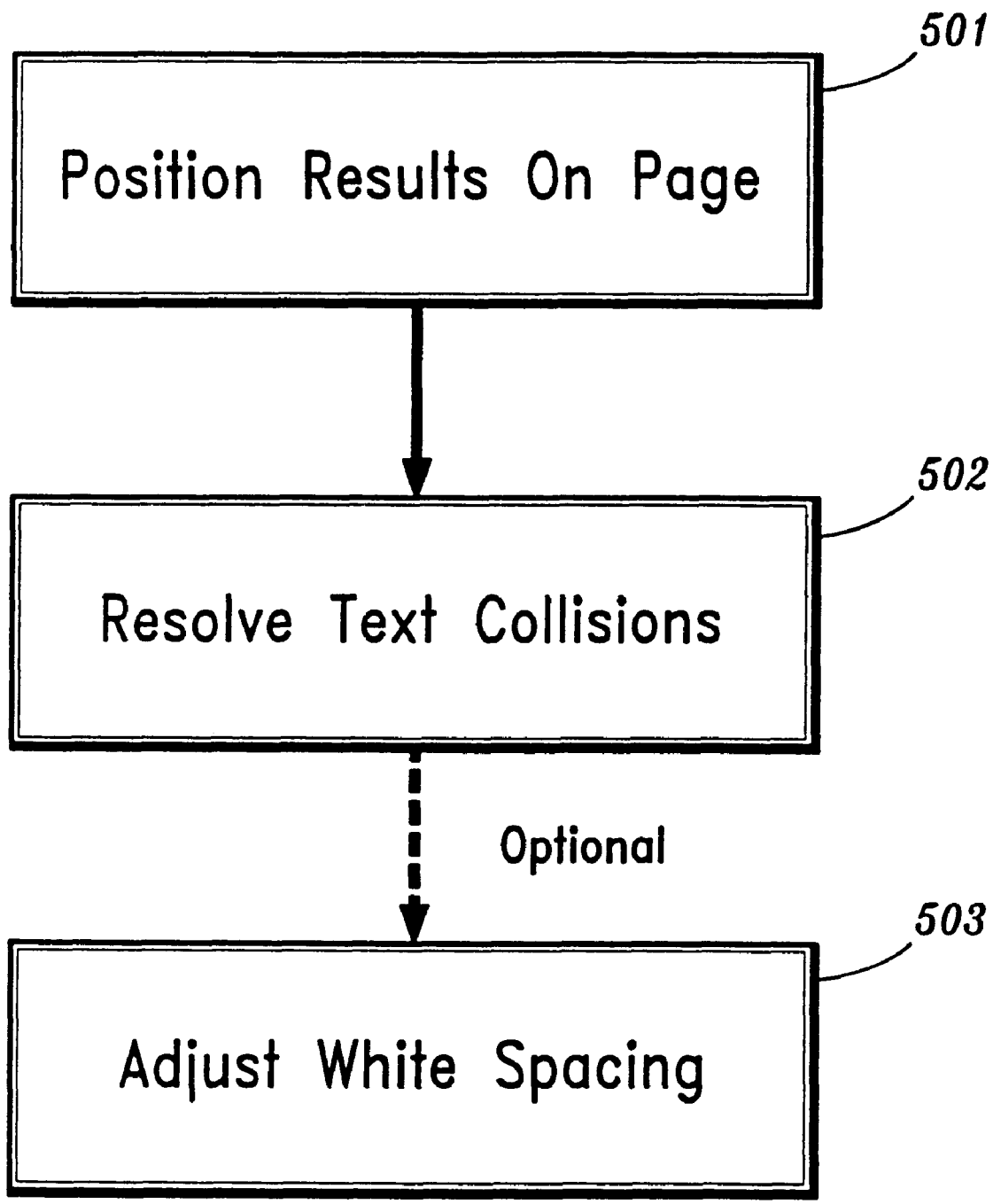
FIG. 5 is a flow diagram of a method for formatting recognition results in accordance with one aspect of the present invention.

Referring now to FIG. 5, a flow diagram illustrates a method for formatting recognition results which may be employed in the formatting module 39 (FIG. 1) and step 206 of FIG. 2. After the recognition results are merged with the current recognition state (step 205 FIG. 2), the merged recognition results are positioned on a page for display (step 501). Briefly, this process involves placing the recognition results on a display page in the approximate location of the corresponding recorded ink. This positioning step can be performed in one of several ways as explained in greater detail below with reference to FIGS. 7 and 8.

Once the recognition results are positioned on the display page (step 501), any remaining text collisions are resolved (step 502). Briefly, text collisions refer to overlapping recognition text results. Text collisions can occur even when there are no corresponding overlaps in the ink page because the ink height/width may not match the recognition text height/width. Other problems that may be encountered are as follows: the recognition text may extend beyond the margin of the page; bounding regions may span multiple text lines; the columns may not line up; the line count per unit length may vary from column to column; and the text may be sloped. This collision resolution process can be performed in one of several ways as explained in greater detail below with reference to the flow diagrams of FIGS. 11 and 12.

After the text collisions are resolved (step 502), an optional "white space" adjusting process may be performed (step 503). The term "white space" refers to spaces with no corresponding recognition results (e.g., tabs and spaces). Based on the relative size between the recorded ink and the corresponding recognition results, the white spaces may need to be decreased or increased. For instance, if the recorded ink for two adjacent words is large as compared to the machine font of their corresponding recognition results, the two (recognized) words may be separated by a large space when they are displayed. The white space adjusting process may be performed in various manners. For instance, one method would be to (1) determine the ratio of the white spaces on the ink page to the average width for each character of the recorded ink ("ink space ratio"; (2) determine the ratio of the white spaces of the recognition results to the average width of each text character ("recognition space ratio"); and (3) then adjust white spacing of the recognition results such that the "recognition space ratio" is approximately equal to the "ink space ratio". Other methods for adjusting the white spaces may be envisioned by those skilled in the art.

Figure 7:
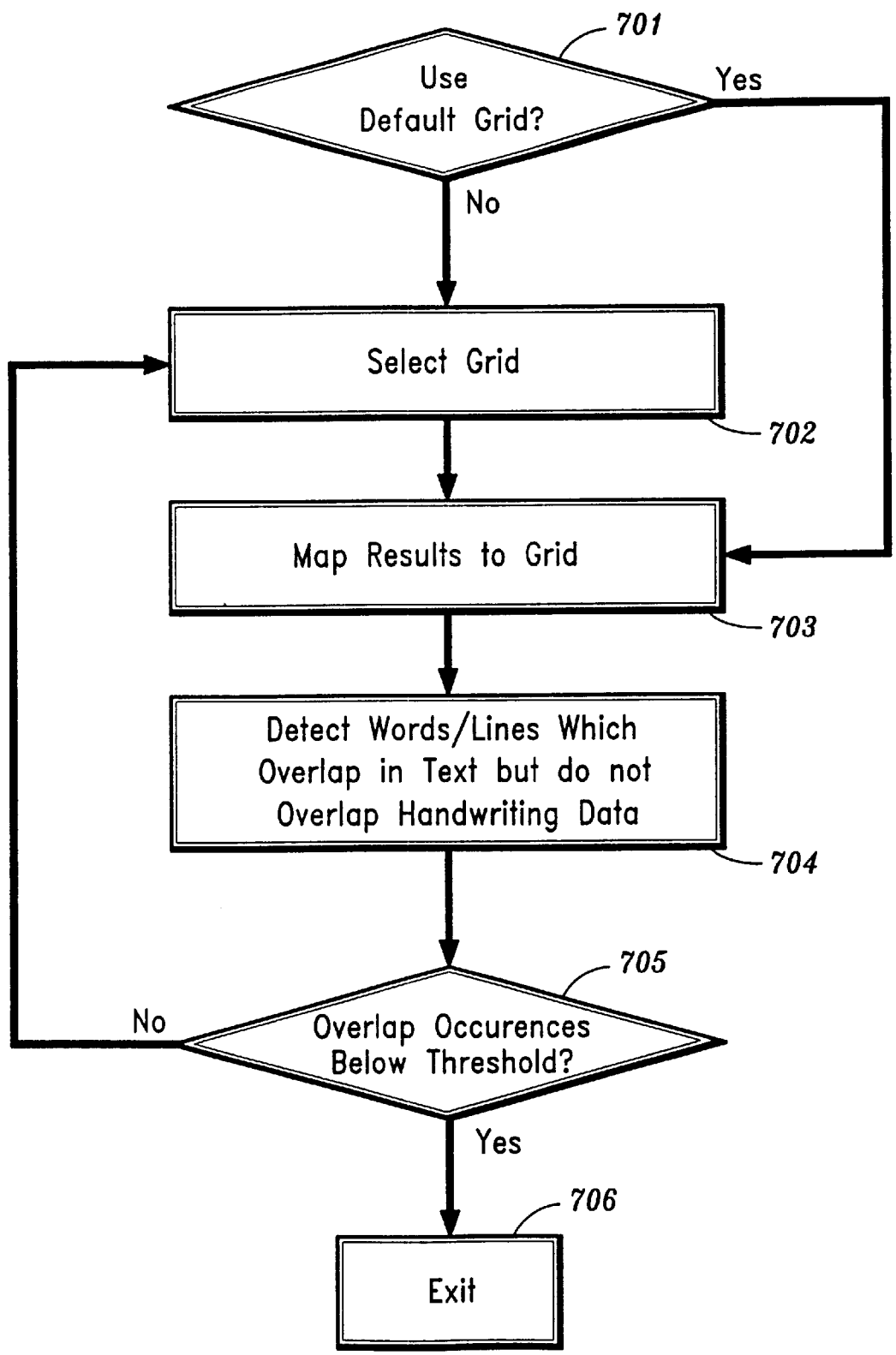
FIG. 7 is a flow diagram of a method for positioning recognition results on a display page in accordance with one aspect of the present invention.

Referring now to FIG. 7, a flow diagram illustrates a method for positioning the recognition results according to one aspect of the present invention which may be implemented in step 501 of FIG. 5 (and the formatting module 39 of FIG. 1). Initially, a determination is made as to whether a default grid is employed (step 701). The default grid may be defined by any predetermined number of lines and columns assigned per page and having a given resolution of x-y coordinates. Alternatively, the user may select a grid having a desired resolution (step 702). Next, the recognition results are mapped to the grid (step 703). This mapping process is performed by selecting a bounding region reference coordinate and then placing the recognition result corresponding to the strokes member(s) of each bounding region at the closest grid location (x-y coordinate) corresponding to the selected reference coordinate. The bounding region reference coordinate may be, for example, the upper left corner of each bounding region, the lower left corner of each bounding region, or the point in the middle of the left side of each bounding region.

After the recognition results (i.e., machine printed text) are mapped to the grid, the words or lines which overlap in text (but which do not overlap in corresponding handwriting data) are detected (step 704). In particular, the mapped results are processed to determine the amount, if any, of overlap (in either the x or y direction) of the actual recognition results. For instance, if the default (or user-defined) grid does not have enough resolution, there may be significant overlap in the recognition text on the grid. If the percentage of detected overlaps falls below a predetermined threshold (affirmative result in step 705), then the recognition results previously mapped to the user-defined grid are accepted and the positioning process is terminated (step 707). On the other hand, if the percentage of detected overlaps does not fall below the predetermined threshold (negative result in step 705), then the system will automatically select a grid with the proper resolution (return to step 702) (which may be done iteratively or in one step using a suitable algorithm). If the user initially selected the grid (in step 702), the user will be prompted to define a new grid (return to step 702) and the process is repeated. This process ensures that the recognition results are placed in the approximate spatial locations of the corresponding ink without undue overlap of the text recognition results.

Figure 8:
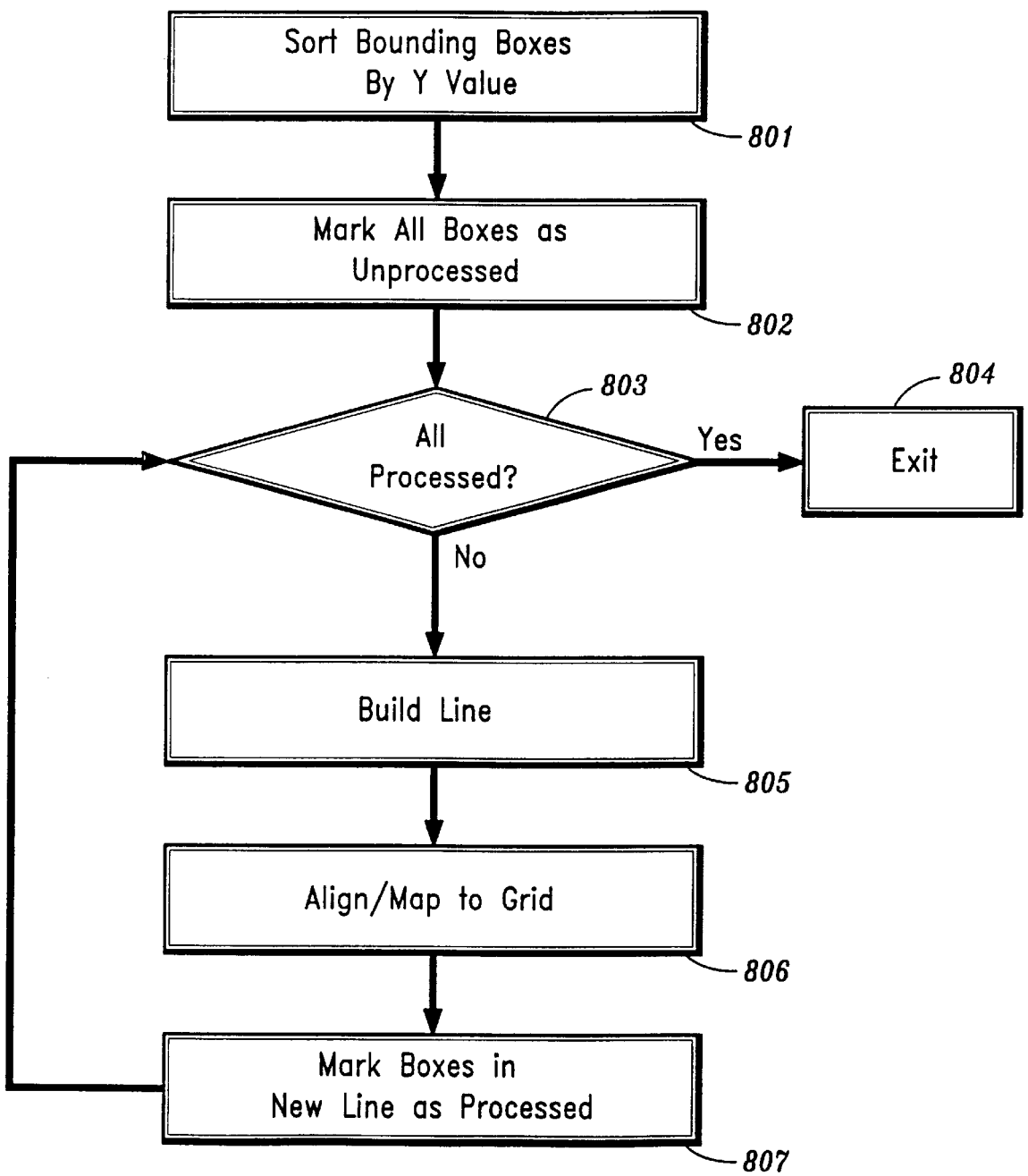
FIG. 8 is a flow diagram of a method for positioning recognition results on a display page in accordance with another aspect of the present invention.

Referring now to FIG. 8, a flow diagram illustrates another method for positioning the recognition results which may be employed in accordance with the present invention. This method may be used in addition to, or in lieu of, the method of FIG. 7. This method builds complete lines one at a time from top to bottom. Initially, the recognition results are sorted in ascending order in accordance with the minimum Y value of the bounding region (step 801). Each bounding region is then marked as unprocessed (step 802). While unprocessed regions exist (negative result in step 803), a line is built (step 805). It is to be appreciated that various methods may be utilized for building the line. For instance, the previously clustered lines (i.e., SL groups) may be used. Other line building methods which may be implemented are explained in greater detail below with reference to the flow diagrams of FIGS. 9 and 10 It is to be understood that all line building algorithms described herein may be implemented in both the spatial sorting and formatting methods of the present invention. Once the line is built (step 805), the line is aligned/mapped to a display page grid (step 806) (which may be either a default or user-defined grid as discussed above). This mapping may be performed by selecting a grid line based on the average mid-line of the bounding regions associated with the built line. If the selected grid line is not below the previous line, the next line is selected. The recognition results are then aligned to the grid on the line using X values. Once the line is mapped to the grid (step 806), the bounding regions in the line are marked as processed (step 807) and the process is repeated (return to step 803) until all bounding regions are processed (affirmative result in step 803) at which time the process is terminated (step 804).

Figure 9:
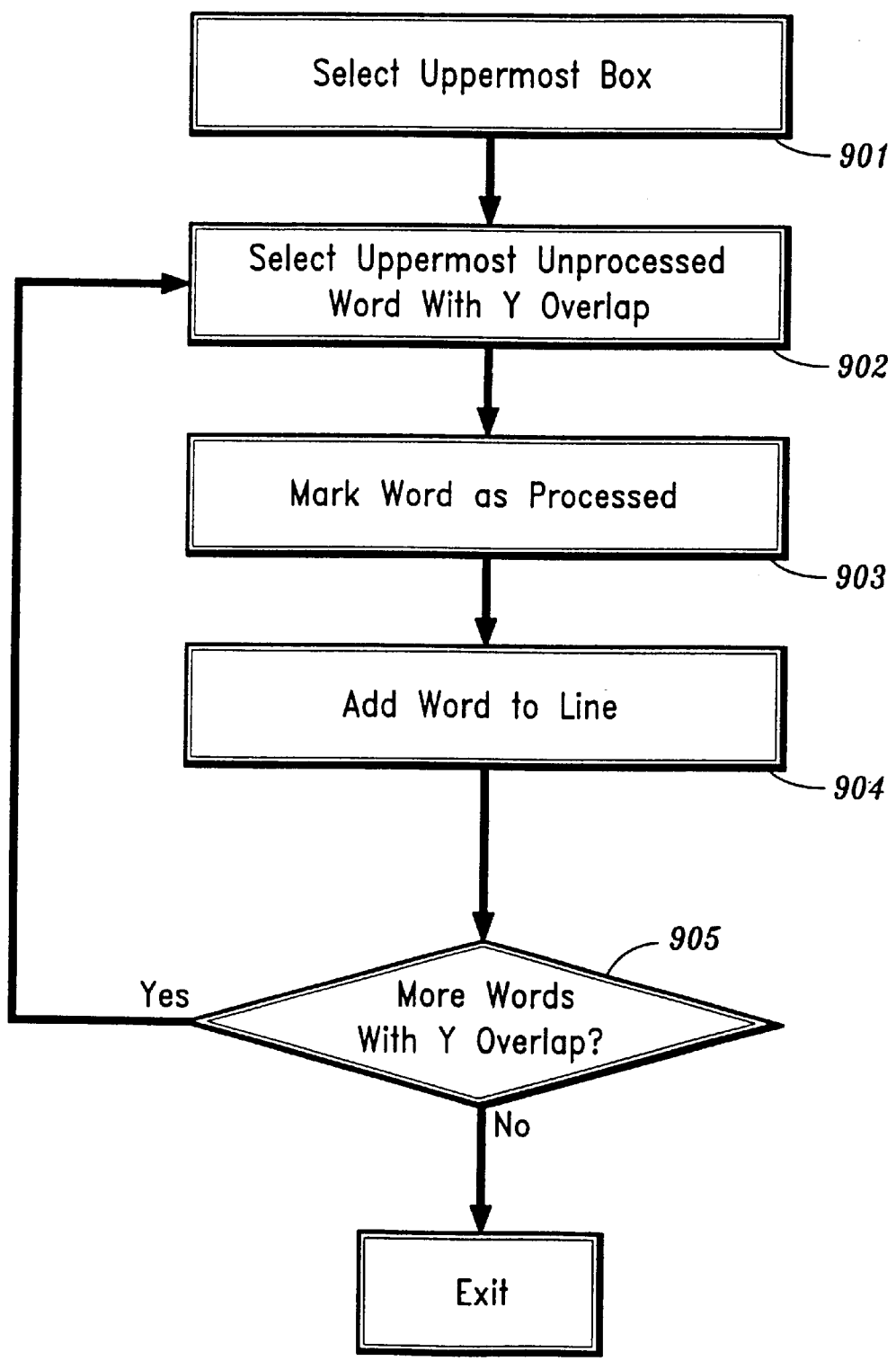
FIG. 9 is a flow diagram of a method for building lines in accordance with one aspect of the present invention.

Referring now to FIG. 9, a flow diagram illustrates a method for building a line (step 805 of FIG. 8) in accordance with one aspect of the present invention. With this method, a line is built by adding all bounding regions (words) having a Y projection overlap with any other bounding region in the line. Initially, based on the ordered bounding regions of step 801 FIG. 8, the uppermost (first) unprocessed bounding region is selected (step 901). Then, the next most uppermost (second) unprocessed bounding region having a Y overlap with the first bounding region is selected (step 902). The word associated with the second selected bounding region is then marked as processed (step 903) and added to the new line (step 904). A determination is then made as to whether there are any other unprocessed bounding regions having a Y projection overlap with any of the previous selected words that were added to the line (step 905). If it is determined that more words exist (affirmative result in step 905), then the next uppermost (third) unprocessed bounding region having a Y projection overlap is selected (return to step 902) and the process is repeated until it is determined that there are no other words having a Y projection overlap with any previous words added to the current line (negative determination in step 905) at which time the process terminates (and program control returns to step 806 of FIG. 8).

Figure 10:
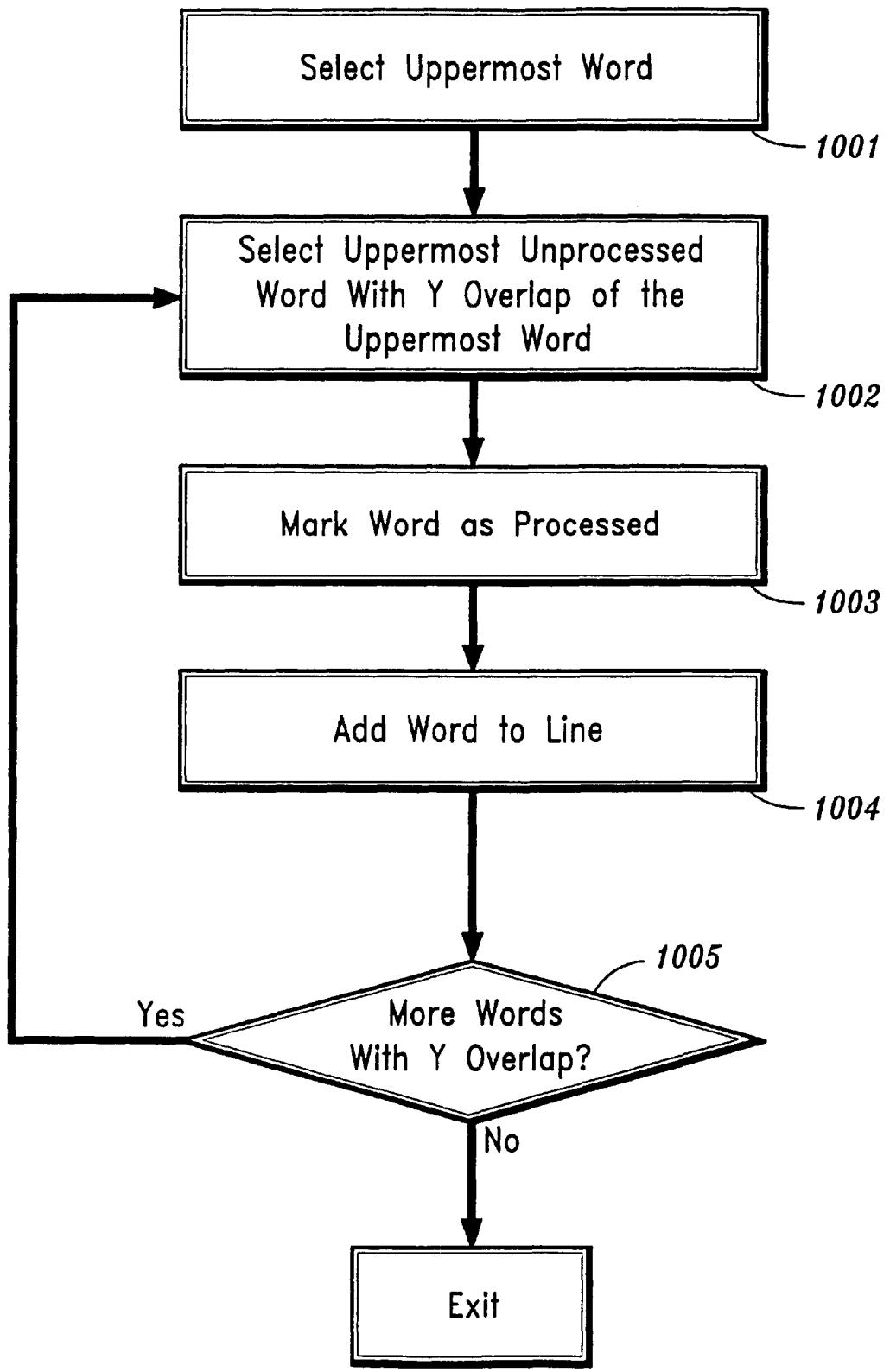
FIG. 10 is a flow diagram of a method for building lines in accordance with another aspect of the present invention.

Referring now to FIG. 10, a block diagram illustrates method for building a line in accordance with another aspect of the present invention. With this method, words are added to the current line only if they are deemed to overlap an uppermost bounding region. Initially, based on the ordered bounding regions of step 801 FIG. 8, the uppermost (first) unprocessed bounding region is selected (step 1001). Then, the next most uppermost (second) unprocessed bounding region having a Y overlap with the first bounding region is selected (step 1002). The word associated with the second selected bounding region is then marked as processed (step 1003) and added to the new line (step 1004). A determination is then made as to whether there are any other unprocessed bounding regions having a Y projection overlap with the first bounding region (step 1005). If it is determined that more words exist (affirmative result in step 1005), then the next uppermost (third) unprocessed bounding region having a Y projection overlap with the first bounding region is selected (return to step 1002). The process is repeated until it is determined that there are no other words having a Y projection overlap with the first selected bounding region (negative determination in step 1005) at which time the process terminates (and program control returns to step 806 of FIG. 8).

Figure 11:
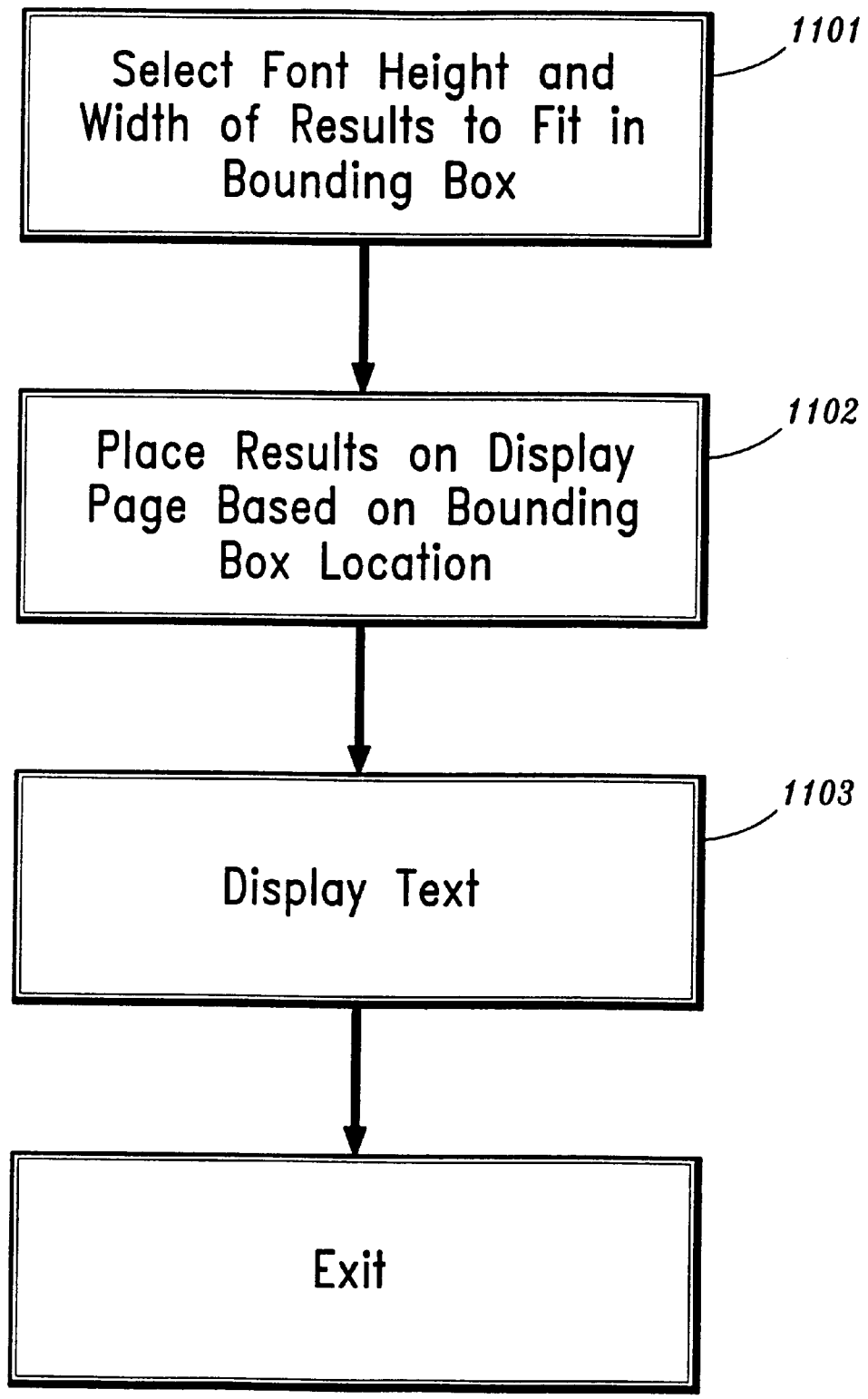
FIG. 11 is a flow diagram of a method for resolving text collisions in accordance with one aspect of the present invention.

As stated above, one of several methods may be employed in accordance with the present invention for text collision resolution (step 503 of FIG. 5)). It is to be understood that the term "overlap" in relation to the text collision resolution process corresponds to text not ink; so these methods can be easily adapted to use variable width fonts. Referring to FIG. 11, a flow diagram illustrates one method for text collision resolution in accordance with the present invention. Initially, each text result is formatted to fit its corresponding bounding region by selecting the font height and width to fit into the bounding region (step 1101). Next, the text is placed on the page based on the bounding region location (step 1102). With this method, the text is placed at an absolute location—it is not fit to a grid. This method allows text to overlap but only in those locations where it overlaps on the ink page. Next, the text/recognition results are displayed (display page state) (step 1003) and program control returns to step 207 of FIG. 2.

Figure 12:
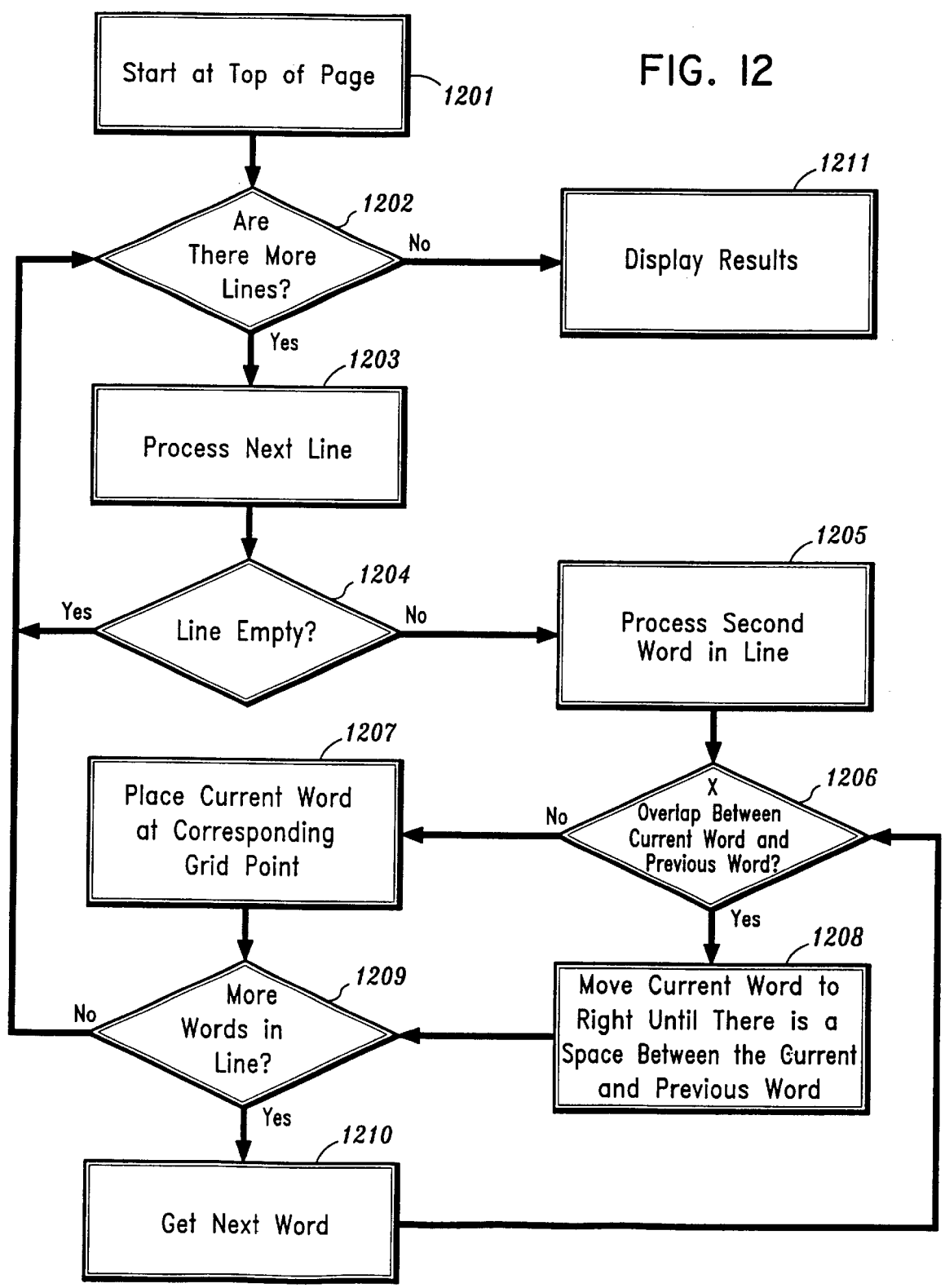
FIG. 12 is a flow diagram of a method for resolving text collisions in accordance with another aspect of the present invention.

Referring now to FIG. 12, a flow diagram illustrates another method for resolving text collisions which may be employed in accordance with the present invention. Initially, program control begins by obtaining each line of the page starting at the top of the page (step 1201) and processing each line from top to bottom (steps 1202 and 1203). For each line having text results (step 1204), the second word is processed (1205) and compared with the first word of the line (step 1206). If it is determined that the current text result (word) X-overlaps any previous text result (affirmative decision in step 1206), the current word will be moved to the right until there is a space between the current word and the previous word in the sorted list (step 1208). On the other hand, if it is determined that the current word does not X-overlap any previous word of the line (negative determination in step 1206), the current word will be remain at its corresponding grid point (step 1207). (It is to be understood that the current word and the previous word will always be the second and first word, respectively, for the first iteration of text collision resolution for a given line, and the first word of a grid line is left where it is.) A determination is then made as to whether there are more text words in the line (step 1209). If there are more text words (affirmative decision in step 1209), the next text word is obtained (step 1210) and compared to the previous word (step 1206). This process is then repeated for the given line until there are no more words in the line (negative determination in step 1209) and until there are no more lines (negative determination instep 1202) and the recognition results are displayed (step 1211). Program control then returns to step 207 of FIG. 2.

Although illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A program storage device readable by a machine, tangibly embodying a program of instructions executable by the machine to perform method steps for spatially formatting recognition results of handwriting data, wherein the handwriting data comprises a set of strokes, each stroke comprising a set of x-y coordinates, the method steps comprising:

determining bounding region information for unconstrained handwriting data based on x-y coordinates associated with the unconstrained handwriting data;

generating recognition results for the unconstrained handwriting data, the recognition results comprising recognized text corresponding to the unconstrained handwriting data; and spatially formatting the recognition results, wherein the step of spatially formatting the recognition results comprises positioning the recognized text on a display page in substantially a same proximate spatial location as the corresponding unconstrained handwriting data is located on an ink page using the bounding region information for the corresponding unconstrained handwriting data.

2. The program storage device of claim 1, further including instructions for performing the step of resolving collisions between recognized text on the display page.

3. The program storage device of claim 2, wherein the instructions for performing the step of resolving collisions between recognized text on the display page include instructions for:

receiving each line of the display page having recognized words positioned therein; and iteratively processing each word starting at a beginning of the line and moving any current word which overlaps in text with any previously processed word in a desired direction until there is no text overlap.

4. The program storage device of claim 2, wherein the instructions for performing the step of resolving collisions between recognized text on the display page include instructions for:

selecting a font size of the recognized text such that the recognized text fits in the bounding region of the corresponding handwriting data; and placing the recognized text on the display page based on the bounding region location.

5. The program storage device of claim 1, further including instructions for performing the step of adjusting white spaces on the display page.

6. The program storage device of claim 1, wherein the instructions for performing the positioning step include instruction for:
   selecting a grid for the display page, the grid comprising grid coordinates; and
   mapping the recognized text to the grid by placing the recognized text at a grid coordinate that corresponds to a reference coordinate of the bounding region of the corresponding handwriting-data.

7. The program storage device of claim 6, wherein the instructions for performing the step of selecting a grid includes instructions for one of automatically selecting a default grid and prompting a user to select a grid.

8. The program storage device of claim 6, further including instructions for performing the steps of:
   detecting a percentage of text overlap on the grid after the mapping step;
   comparing the detected percentage to a predefined threshold value; and
   adjusting the resolution of the grid coordinates if the detected percentage falls below the predefined threshold value.

9. The program storage device of claim 1, wherein the instructions for performing the positioning step include instruction for:
   sorting the recognition results in a desired order based on a first reference coordinate of the bounding regions of the corresponding handwriting data;
   building a line for each group of spatially related recognition results in the sorted order based on the bounding region information; and
   mapping the lines to a grid comprising grid coordinates.

10. The program storage device of claim 9, wherein the instructions for the mapping step include instructions for:
    selecting a grid line having a coordinate which corresponds to an average of the first reference coordinates of the bounding regions associated with the built line; and
    aligning the recognition results on the grid line based on a second reference coordinate of the bounding regions associated with the built line.

11. The program storage device of claim 9, wherein the instructions for performing the line building step include instructions for:
    (a) selecting a group of unprocessed bounding regions such that each unprocessed bounding region in the group overlaps with at least one other bounding region in the group in the direction that corresponds to the sorting order;
    (b) building a line from the recognition results corresponding to the selected group of bounding regions;
    (c) marking each of the bounding regions in the group as processed; and
    (d) repeating steps (a)–(c) until all bounding regions have been processed.

12. The program storage device of claim 9, wherein the instructions for performing the line building step include instructions for:
    (a) selecting a desired unprocessed bounding region as a reference bounding region;
    (b) selecting all unprocessed bounding regions which overlap with the reference bounding region in the direction that corresponds to the sorting order;
    (c) building a line from the recognition results corresponding to the selected bounding regions;
    (d) marking the selected bounding regions as processed; and
    (e) repeating steps (a) through (d) until all bounding regions have been processed.

13. The program storage device of claim 1, further including instructions for:
    tracking a recognition state comprising previous recognition results for each recorded page of handwriting data; and
    merging current recognition results with a corresponding recognition state to produce the recognition results that are processed for display.

14. The program storage device of claim 13, wherein the instructions for performing the merging step include instructions for:
    comparing the current recognition results with the corresponding recognition state; and
    replacing any previous recognition results of the recognition state with the current recognition results which align to the same handwriting data.

15. A system for spatially formatting recognition results of handwriting data, wherein the handwriting data comprises a set of strokes, each stroke comprising a set of x-y coordinates, the system comprising:
    means for determining bounding region information for unconstrained handwriting data based on x-y coordinates associated with the unconstrained handwriting data;
    means for generating recognition results for the unconstrained handwriting data, the recognition results comprising recognized text corresponding to the unconstrained handwriting data; and
    means for spatially formatting the recognition results, wherein the means for spatially formatting the recognition results comprises means for positioning the recognized text on a display page in substantially a same proximate spatial location as the corresponding unconstrained handwriting data is located on an ink page using the bounding region information for the corresponding unconstrained handwriting data.

16. The system of claim 15, further comprising means for resolving collisions between recognized text on the display page.

17. The system of claim 16, wherein the means for resolving collisions comprises:
    means for selecting each line of the display page having recognized words positioned therein; and
    means for iteratively processing each word of each line starting at a beginning of the line and moving any current word which overlaps in text with any previously processed word in a desired direction until there is no text overlap.

18. The system of claim 16, wherein the means for resolving collisions comprises:
    means for selecting a font size of the recognized text such that the recognized text fits in the bounding region of the corresponding handwriting data; and
    means for placing the recognized text on the display page based on the bounding region location.

19. The system of claim 15, further comprising means for adjusting white spaces on the display page.

20. The system of claim 15, wherein the means for positioning comprises:

means for selecting a grid for the display page, the grid comprising grid coordinates; and means for mapping the recognized text to the grid by placing the recognized text at a grid coordinate that corresponds to a reference coordinate of the bounding region of the corresponding handwriting data.

21. The system of claim 20, further comprising:

means for detecting a percentage of text overlap on the grid after the mapping step;

means for comparing the detected percentage to a predefined threshold value; and means for adjusting the resolution of the grid coordinates if the detected percentage falls below the predefined threshold value.

22. The system of claim 15, wherein the positioning means comprises:

means for sorting the recognition results in a desired order based on a first reference coordinate of the bounding regions of the corresponding handwriting data;

means for building a line for each group of spatially related recognition results in the sorted order based on the bounding region information; and means for mapping the lines to a grid comprising grid coordinates.

23. The system of claim 22, wherein the mapping means comprises:

means for selecting a grid line having a coordinate which corresponds to an average of the first reference coordinates of the bounding regions associated with the built line; and means for aligning the recognition results on the grid line based on a second reference coordinate of the bounding regions associated with the built line.

24. The system of claim 15, further comprising:

means for tracking a recognition state comprising previous recognition results for each recorded page of handwriting data; and means for merging current recognition results with a corresponding recognition state to produce the recognition results that are processed for display.

25. The system of claim 24, wherein the merging means comprises:

means for comparing the current recognition results with the corresponding recognition state; and means for replacing any previous recognition results of the recognition state with the current recognition results which align to the same handwriting data.

26. A method for spatially formatting recognition results of handwriting data, wherein the handwriting data comprises a set of strokes, each stroke comprising a set of x-y coordinates, the method comprising the steps of:

determining bounding region information for unconstrained handwriting data based on x-y coordinates associated with the unconstrained handwriting data;

generating recognition results for the unconstrained handwriting data, the recognition results comprising recognized text corresponding to the unconstrained handwriting data; and spatially formatting the recognition results, wherein the step of spatially formatting the recognition results comprises positioning the recognized text on a display page in substantially a same proximate spatial location as the corresponding unconstrained handwriting data is located on an ink page using the bounding region information for the corresponding unconstrained handwriting data.

* * * * *